J. J. TATUM.
SPRING BEAM AND SPRING SEAT FOR CAR TRUCKS.
APPLICATION FILED JUNE 30, 1919.
1,318,240.
Patented Oct. 7, 1919.
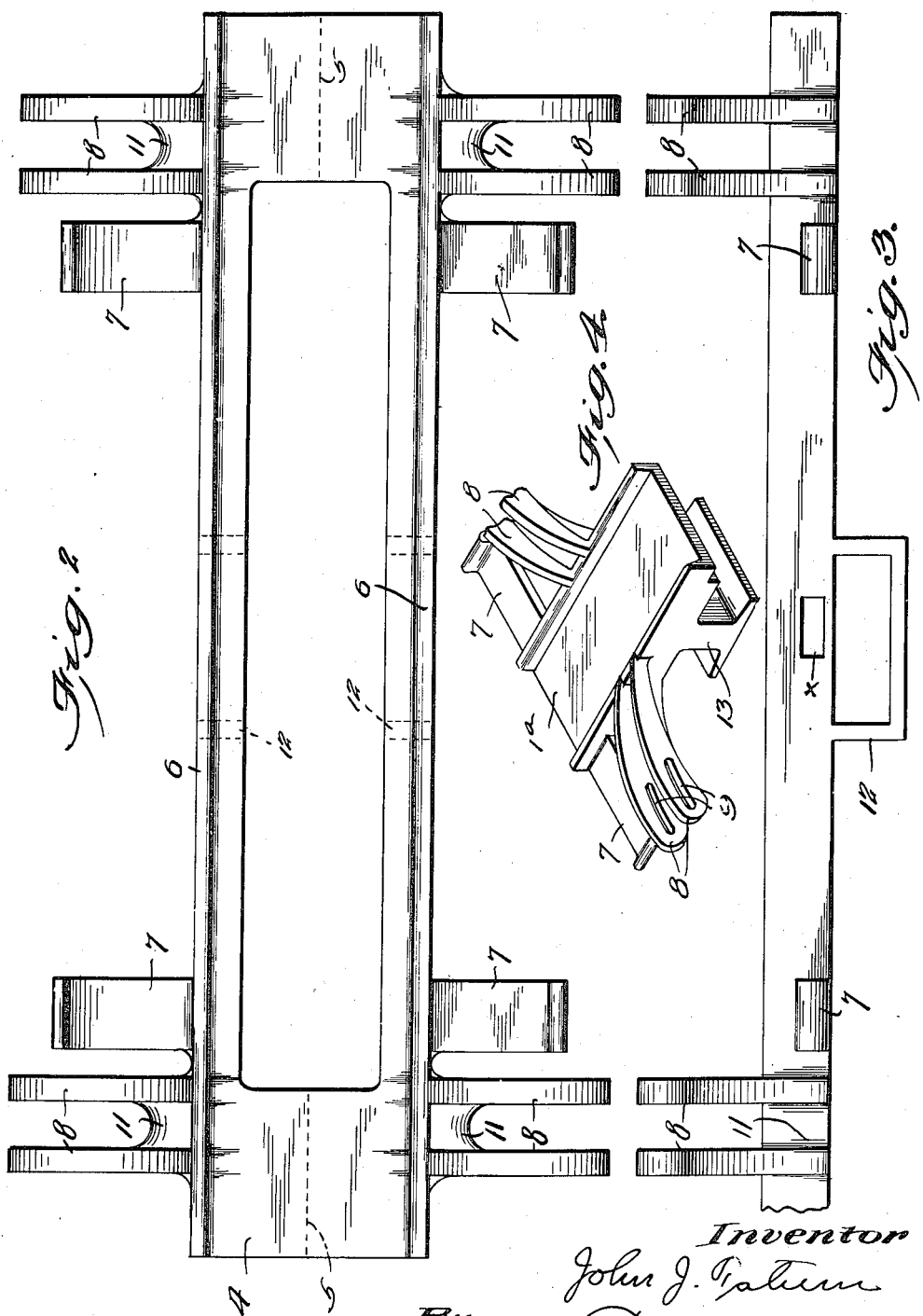

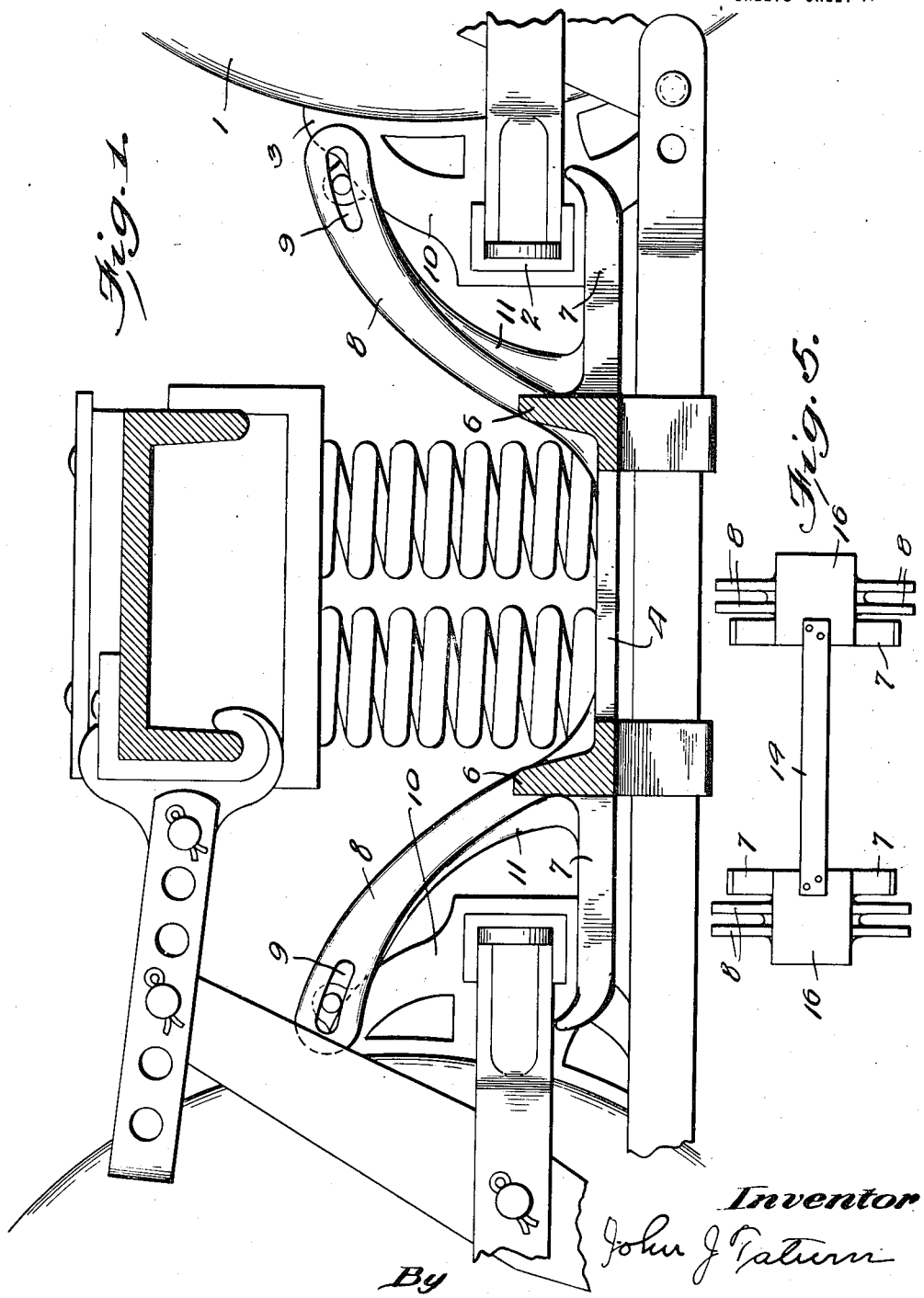

UNITED STATES PATENT OFFICE.

JOHN J. TATUM, OF BALTIMORE, MARYLAND.

SPRING-BEAM AND SPRING-SEAT FOR CAR-TRUCKS.

1,318,240.	Specification of Letters Patent.	Patented Oct. 7, 1919.

Application filed June 30, 1919. Serial No. 307,541.

*To all whom it may concern:*

Be it known that I, JOHN J. TATUM, a citizen of the United States of America, residing in the city of Baltimore, State of Maryland, have invented certain new and useful Improvements in Spring-Beams and Spring-Seats for Car-Trucks, of which the following is a specification.

In the standard construction of car trucks, the elements, such as brake beam safety arms, brake head supports, brake beam spring supports, and brake rod supports are formed separately and are "laced," or assembled by means of bolts, rivets and the like, the bolts, rivets and the like securing these several elements in assembled position, are liable to and do become loose, or fractured and fall out, whereby the brake beam, the brake head, and rod are liable to and do fall on track and cause derailment of the car, which results in damage to property and injury and death of passengers.

It frequently happens, in the present day standard construction, that a brake shoe head hanger, or a brake beam safety arm must be replaced, and frequently such replacement is made under adverse circumstances, which result in make-shift repairs, which are liable to and do result in an accident, and which may and do subject the railroad to penalty by the Federal and State inspector. In many of the make-shift replacements of brake shoe head hangers, the brake shoe is improperly positioned for effective braking action, which results in an uneven wear on the shoe, or on the wheel, and if the brake shoe should happen to be below the center of the wheel, it would have a lifting action, rather than proper braking action.

The object of my invention is to provide, as a new article of manufacture, a spring beam or spring seat for car trucks, formed with brake beam safety arms, brake head supporting arms, and brake rod safety loop, all of said parts being formed integrally, thereby eliminating all danger, or liability of the parts becoming loose and detached.

In the drawing Figure 1, is a vertical longitudinal section of a car truck, parts being broken away, with my invention embodied therein.

Fig. 2, is a top plan view of a spring beam embodying my invention.

Fig. 3, is a front elevation of Fig. 2.

Fig. 4, is a detail perspective sectional view of another embodiment of my invention.

Fig. 5, is a top plan view of still another embodiment of my invention.

The reference numeral 1 designates the usual car wheels, 2, the brake beam and 3, the brake shoe head.

While in the specification and claims, I may use the word "cast," it will be understood that I do not wish to be limited to a casting, because my improved spring beam, with its integral parts may be made by drop forging, or other process.

The body of the spring plank 4, may be formed in one piece, or it may be formed in two pieces along the dotted lines 5. To eliminate as much weight as is possible, consistent with safety, and to reduce cost, I form the center portion of the body of the beam in skeleton form. The spring beam is provided with ribs, 6 along each side.

Extending laterally from each side of the spring beam 4, are the brake beam safety arms 7. The brake head supporting arms 8, extend upwardly and outwardly from each side of the spring beam, as is more clearly shown in Fig. 1, and are provided at their upper ends with an elongated slot 9, to receive the bolt, or other fastening device by means of which the brake head 10 is suspended from the upper end of the supports 8. In order to increase the strength of the brake head supporting arms, 8, I provide said arms with a strengthening rib 11.

Extending from the under face of the spring beam is the brake safety loop 12, and in the ribs of the spring beam I form an aperture, for the brake beam support spring.

From the above it will be seen that I have provided, as a new article of manufacture, a spring beam or spring seat formed with brake beam safety arms, brake rod safety loop, and brake head supporting arms, all parts being cast, or otherwise formed integrally.

In Fig. 4, I have shown another embodiment of my invention, in which the spring beam 1ª is cast integrally with the side members 13 of the truck, so that in this embodiment, I provide as a complete new article of manufacture, a truck side member and spring beam brake beam safety arms, and brake head supporting arms, all formed integrally, so that the assembling of the side members of the truck in position, assembles the other integral elements in their respective positions. The term "side members" is to be understood as including "columns" and "pedestals" casting.

In Fig. 5, I have shown still another embodiment of my invention, wherein the spring beam is formed in two short members 1^b, as spring seats the brake beam safety arms and the brake head supporting arms being formed integrally with the spring beam spring seats. In this embodiment the two sections of spring beam are tied together by means of the tie member 14. In this embodiment the cost and weight of the spring beam is materially reduced.

Among the advantages, which result from my invention, are the following:

I eliminate all danger of the parts becoming loosened and detached, and consequently eliminate the liability of the brake rod, or brake beam from falling to the track, thus eliminating the danger of derailments.

Another advantage, which results from my invention, is that there is a very material saving in labor in assembling the separate parts now used in the standard trucks.

The further advantage of my invention is, that it will not be necessary to have the rigid inspection for loose parts, which is now necessary with the present standard construction.

Another advantage of my invention, is uniformity of construction, and the maintenance of uniformity of construction, and uniformity of brake shoe wear, inasmuch as the integral construction dispenses with the usual brake hanger and insures the uniform position of the brake shoes relative to the wheel.

I prefer to form the web of the spring beam in skeleton form, as shown, because it reduces the weight, and as every pound of weight saved in construction means an increase of one pound carrying capacity of the car, it will be appreciated that in a long freight train, this increase carrying capacity, will be very material, besides which the skeleton form reduces the dead weight to be carried by an empty as well as a loaded car, thus saving in the motor force.

What I claim is:

1. As a new article of manufacture a combined spring beam, brake beam safety arms, brake rod safety loop and brake head support arms all cast integrally.

2. As a new article of manufacture a combined spring beam, brake beam safety arms, and brake head supporting arms, all cast integrally.

3. As a new article of manufacture, a combined spring beam, brake safety arms, and brake rod safety loop, all cast integrally.

4. As a new article of manufacture a combined spring beam and brake beam safety arms all cast integrally.

5. As a new article of manufacture a combined spring beam, brake beam safety arms, brake rod safety loop, and brake head supporting arms all formed integrally.

6. As a new article of manufacture a spring beam for car trucks formed with brake beam safety arms and brake head supporting arms, all of said parts being formed integrally.

7. As a new article of manufacture for car trucks, a combined spring beam, truck side member, brake beam safety hanger, and brake head support all formed integrally.

8. As a new article of manufacture a spring seat for car trucks formed with brake beam safety arms and brake head supporting arms, all of said parts being formed integrally.

9. As a new article of manufacture for car trucks a combined spring seat, for car trucks formed with brake beam safety arms, all of said parts being formed integrally.

10. As a new article of manufacture, a combined spring beam, brakes safety arms, brake rod safety loop; brake beam support, and spring aperture, all cast integrally.

In testimony whereof I affix my signature.

JOHN J. TATUM.